United States Patent [19]

Yoshinaka

[11] Patent Number: 4,677,497
[45] Date of Patent: Jun. 30, 1987

[54] APPARATUS FOR RECORDING AND REPRODUCING A VIDEO SIGNAL WITH REDUCED COLOR SUBCARRIER INTERFERENCE

[75] Inventor: Tadaaki Yoshinaka, Kanagawa, Japan

[73] Assignee: Sony Corporation, Tokyo, Japan

[21] Appl. No.: 680,283

[22] Filed: Dec. 10, 1984

[30] Foreign Application Priority Data

Dec. 15, 1983 [JP] Japan ................ 58-236786

[51] Int. Cl.⁴ .............................................. H04N 9/80
[52] U.S. Cl. .................................. 358/310; 358/327; 358/328; 358/330
[58] Field of Search ............... 358/310, 330, 327, 328; 360/33.1, 39

[56] References Cited

U.S. PATENT DOCUMENTS 4,463,387  7/1984  Hashimoto et al. ........... 360/33.1 X
4,468,710  8/1984  Hashimoto et al. ........... 360/33.1 X Primary Examiner—Robert L. Richardson
Attorney, Agent, or Firm—Lewis H. Eslinger; Alvin Sinderbrand

[57] ABSTRACT

An analog composite color video signal is recorded on and reproduced from a recording medium by frequency modulation and demodulation. A circuit is provided for digitally separating the video signal to a first frequency band signal and a second frequency band signal including a color subcarrier. Another circuit converts the frequency band signal to first and second base band signals, a circuit for time-compressing at least the first and second base band signals, a circuit for recording and reproducing the first frequency band signal and the time-compressed first and second base band signals in an analog mode, a circuit for digitally recombining the reproduced first frequency band signal and the time-compressed first and second base band signals, and a circuit for converting the recombined digital video signal to the analog composite color video signal.

5 Claims, 12 Drawing Figures

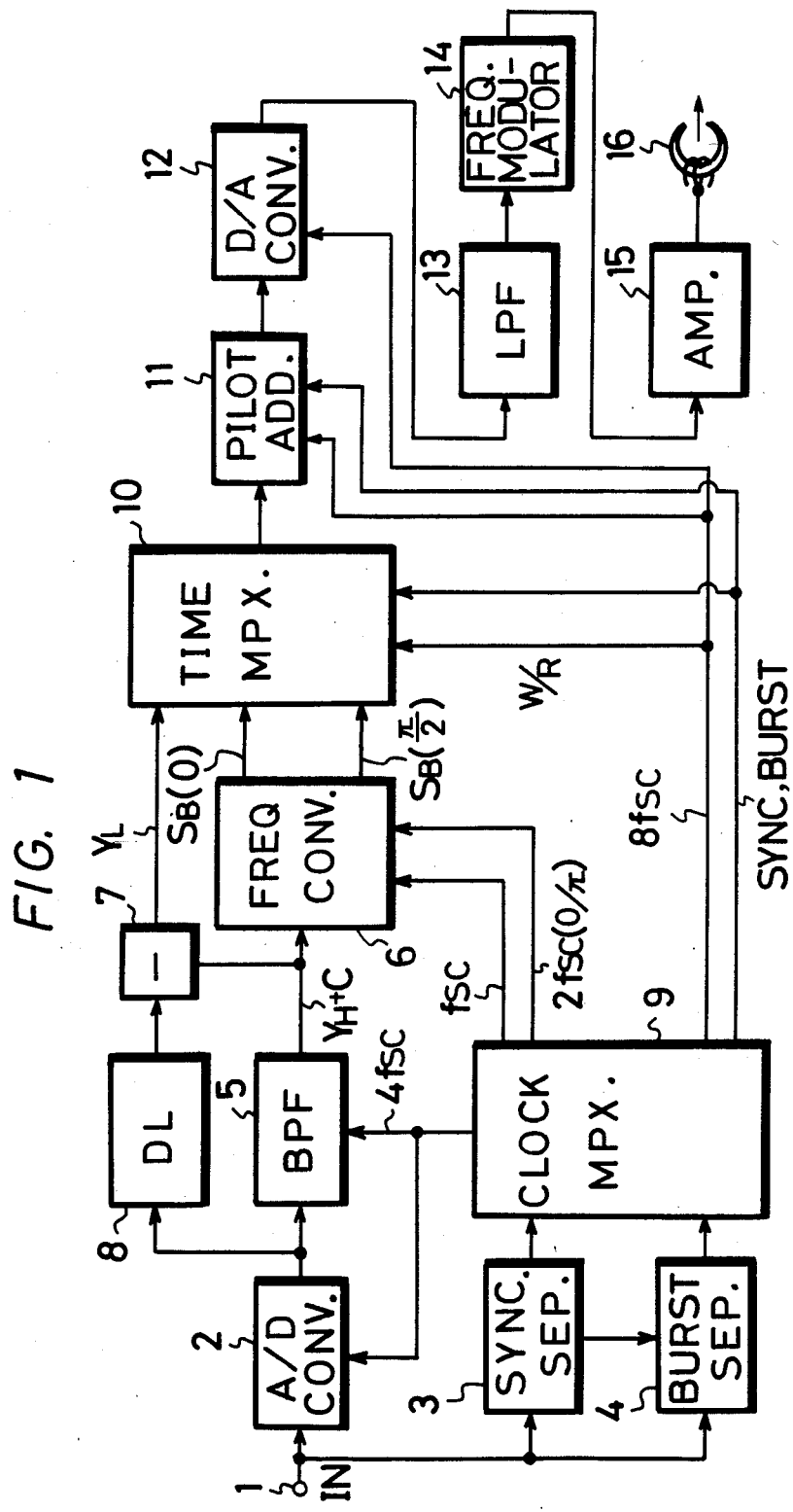

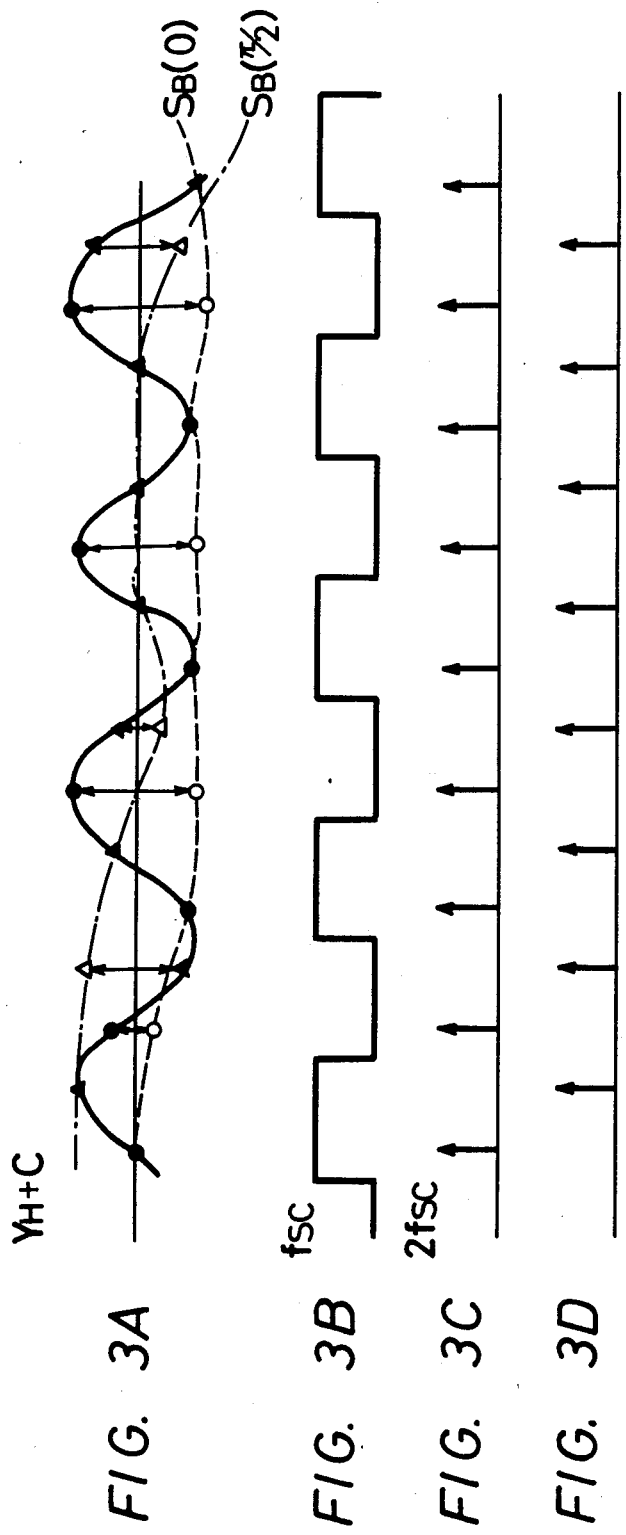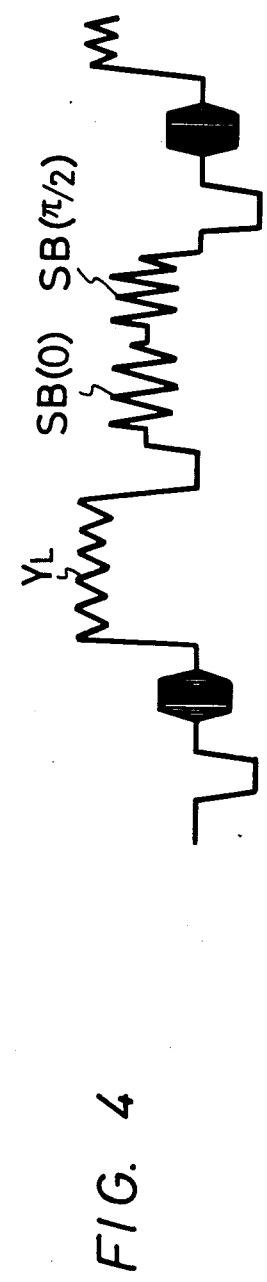

4,677,497

APPARATUS FOR RECORDING AND REPRODUCING A VIDEO SIGNAL WITH REDUCED COLOR SUBCARRIER INTERFERENCE

BACKGROUND OF THE INVENTION

1. Field of the Invention

The present invention relates generally to a color television signal transmitting system and more particularly relates to an apparatus for recording and reproducing a video signal on a recording medium by frequency modulation and demodulation.

2. Description of the Prior Art

In the existing broadcasting video tape recorder (VTR), a carrier wave is directly FM (frequency modulation) modulated by a composite video signal, this FM-modulated video signal is recorded on a magnetic tape, the recorded video signal is reproduced therefrom and then demodulated, whereby a reproduced picture of high quality is obtained.

However, in the above direct FM-modulation system, the frequency of the FM carrier wave is close to the frequency band of the video signal so that particularly when recording and reproducing a composite color television signal that has a color subcarrier wave in a relatively high frequency band of the video signal frequency, there is an essential problem such as moiré, over-modulation, deterioration of DP (differential phase) and DG (differential gain) characteristics and so on. Further, since color information is contained in the phase of the color subcarrier wave, irregularity of color is caused by jitter of a video tape recorder (VTR). In this case, a fast jitter component can not sufficiently be removed even by using a time base corrector.

To overcome the above shortcomings of the direct FM-modulation recording system of the composite color video signal, a technique in which a video signal is transmitted in the form of a component signal is disclosed in, for example, a document of a Japanese patent application examined No. 13538/1969. Although the composite video signal can be transmitted via one transmission system, strict requirements for S/N (signal-to-noise) ratio, phase characteristic, jitter of the transmission system and so on are not completely satisfied. As a result, in the invention disclosed in the above document, a chromaticity signal derived from a parallel color signal formed of a luminance signal and at least two chromaticity signals is time-compressed so as to make its frequency band substantially the same as that of the luminance signal. This time-compressed chromaticity signal is inserted into a horizontal blanking period of the luminance signal or the nearby portion thereof, to thereby provide a serial color signal and then this serial color signal is transmitted.

When the component video signal is directly obtained from a video camera, it is possible to transmit the video signal with high quality by using the above technique. However, most of the existing broadcasting video camera is adapted to produce the composite video signal so that in order to obtain the above time-compressed serial color signal, it is unavoidable to carry out a separation of the luminance signal Y and the chromaticity signal C (hereinafter simply referred to as Y/C separation).

However, in the prior art Y/C separation of an analog signal, the quality of the separated signals is considerably deteriorated so that the afore-noted high quality signal transmission technique can not be employed.

OBJECTS AND SUMMARY OF THE INVENTION

Accordingly, an object of this invention is to provide an improved color television signal transmitting apparatus.

Another object of this invention is to provide an apparatus for recording and reproducing a video signal on a recording medium in which a color television signal transmitting apparatus, which can remove an influence exerted by a color subcarrier signal, is employed.

A further object of this invention is to provide an apparatus for recording and reproducing a video signal on a recording medium in which a color television signal transmitting apparatus capable of carrying out the signal transmission, which is equivalent to that of a component video signal in quality, is employed.

According to one aspect of this invention, there is provided an apparatus for recording and reproducing a video signal on a recording medium by frequency modulation and demodulation, said video signal being applied thereto and being obtained therefrom as an analog composite color video signal comprising:

(a) means for digitally separating said video signal to a first frequency band signal and a second frequency band signal including a color subcarrier;

(b) means for converting said frequency band signal to first and second base band signals;

(c) means for time-compressing at least said first and second base band signals;

(d) means for recording and reproducing said first frequency band signal and said time-compressed first and second base band signals in an analog mode;

(e) means for digitally recombining said reproduced first frequency band signal and said time-compressed first and second base band signals; and (f) means for converting said recombined digital video signal to said analog composite color video signal.

The other objects, features and advantages of the present invention will become apparent from the following description taken in conjunction with the accompanying drawings through which the like references designate the same elements and parts.

BRIEF DESCRIPTION OF THE DRAWINGS

FIG. 1 is a schematic block diagram showing an embodiment of a transmission system (recording system) of the apparatus using a color television signal transmitting system according to this invention;

FIGS. 3A to 3D are respectively waveform diagrams useful for explaining the present invention;

FIG. 4 is a waveform diagram showing an analog signal that is used in the present invention.

DESCRIPTION OF THE PREFERRED EMBODIMENT

Now, an embodiment of an apparatus for recording and reproducing a video signal on a recording medium using a color television signal transmitting system according to the present invention will hereinafter be described in detail with reference to FIGS. 1 to 5. In this case, this invention is applied to a video tape recorder (VTR).

Figure 2A:
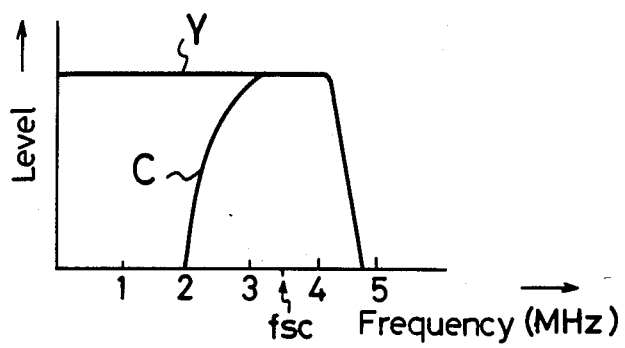
FIGS. 2A to 2E are respectively frequency spectrum diagrams useful for explaining this invention.

FIG. 1 schematically illustrates an example of a recording system of the VTR to which this invention is applied. In FIG. 1, a composite color video signal of, for example, NTSC (national television systems committee) is applied to an input terminal 1 and then commonly supplied to an A/D (analog-to-digital) converter 2, a synchronizing signal separating circuit 3 and a burst signal separating circuit 4. The frequency spectrum of this composite color video signal consists of, as shown in FIG. 2A, a frequency band of a luminance signal Y of 0 to 4.2 MHz and a frequency band of a carrier chrominance signal C of ±1.5 MHz with 3.58 MHz as the center. Reference numeral 5 designates a digital bandpass filter (hereinafter simply referred to as BPF) and reference numeral 6 designates a frequency converter. The output of the A/D converter 2 is supplied to the BPF 5 and the output of the BPF 5 is in turn supplied to the frequency converter 6 and a subtracter 7. Supplied to the subtracter 7 is the output of the A/D converter 2 that is delayed by an appropriate delay time by a delay line 8 and in the subtracter 7, the output of the BPF 5 is subtracted from the delayed output supplied thereto as above. Reference numeral 9 designates a clock signal generator to which a synchronizing pulse and a burst signal with color subcarrier frequency $f_{SC}$ are respectively supplied from the synchronizing signal separating circuit 3 and the burst signal separating circuit 4. On the basis of this burst signal, from the color signal generator 9 there are produced a clock signal with frequency of, for example, 4 $f_{SC}$, which then is fed to the A/D converter 2 and the BPF 5 and, a two-phase signal with frequency of, for example, 2 $f_{SC}$ and the phase of which is 0 (zero) and $\pi$ and a pulse with frequency $f_{SC}$ which are both supplied to the frequency converter 6.

Reference numeral 10 designates a time-compressing multiplexer to which a pair of outputs from the frequency converter 6, the output from the subtracter 7 and the clock signal with the frequency of, for example, 8 $f_{SC}$ from the clock signal generator 9 are respectively supplied. Reference numeral 11 designates a pilot signal adding circuit to which the output from the time-compressing multiplexer 10 and the pilot signal (formed of the synchronizing signal and the burst signal) from the clock signal generator 9 are respectively supplied. The output of the pilot signal adding circuit 11 is sequentially supplied through a D/A (digital-to-analog) converter 12 and a low-pass filter 13 to an FM-modulator 14. The output of the FM-modulator 14 is supplied through a recording amplifier 15 to a magnetic recording head (rotary magnetic head) 16 and then recorded on a recording medium (not shown).

Figure 2B:
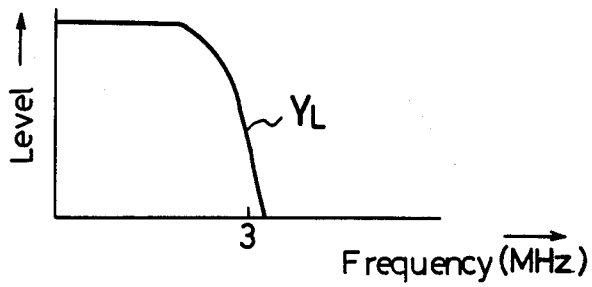
Figure 2C:
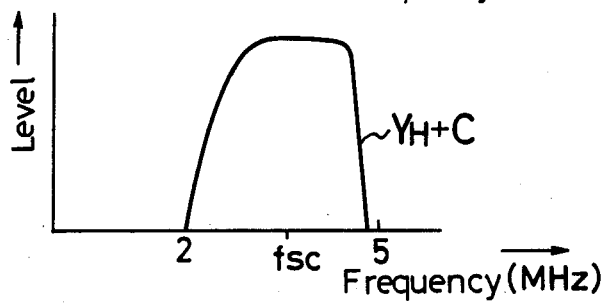

The operation of the recording system shown in FIG. 1 will be now described. A high frequency band signal $S_H$ that is the output of the BPF 5 is a digital signal corresponding to the high frequency component $Y_H$ of the luminance signal Y and the chromaticity signal C (carrier chrominance signal) C, and the equivalent frequency spectrum thereof is as shown in FIG. 2C. For simplicity, the terms "frequency", waveform and so on of the original analog signal are used for those of the transmission signal in the digital signal period, hereinafter. Since the output of the BPF 5 is subtracted from the output of the A/D converter 2, namely, the digital composite signal Y+C in the subtracter 7, the output of the subtracter 7 becomes a low frequency component $Y_L$ of the digital luminance signal Y and the frequency spectrum thereof becomes as shown in FIG. 2B.

Figure 2D:
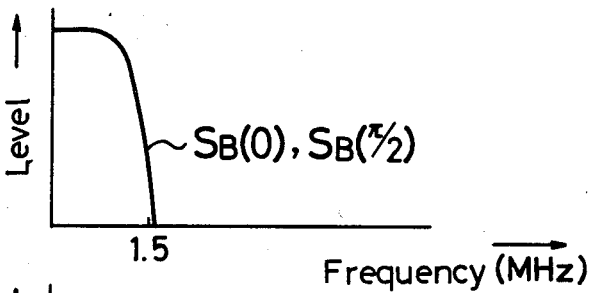
Figure 2E:
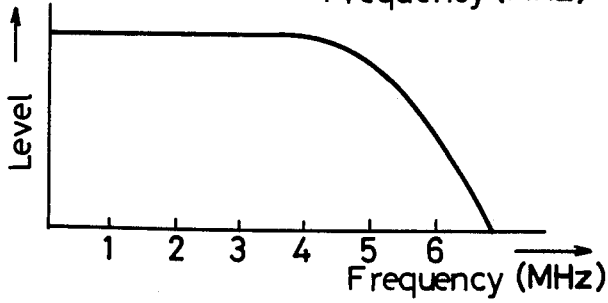

The output of the BPF 5 is frequency-converted to the base band of a low frequency with the frequency $f_{SC}$ as the center in the frequency converter 6 and the frequency spectrum thereof becomes as shown in FIG. 2D. More particularly, the waveform of the output $S_H$ ($=Y_H+C$) from the BPF 5 is, for example, as shown by a solid line in FIG. 3A. This output signal is sampled in the frequency converter 6 by two-phase signals with repetitive frequency 2 $f_{SC}$ and phases of 0 and $\pi$ as shown in FIGS. 3C and 3D to thereby produce a two-phase high frequency band luminance signal $S_H(0)$ that consists of a zero-phase high frequency band luminance signal $Y_{H2}(0)$ and a zero-phase chrominance signal $C_2(0)$ obtained by the sampling of the zero-phase signal and a signal $S_H(\pi/2)$ that consists of a $\pi$-phase high frequency band luminance signal $Y_{H2}(\pi/2)$ and a $\pi$-phase chrominance signal $C_2(\pi/2)$ obtained by the sampling of the $\pi$-phase signal. As is clear from FIG. 3, between the two-phase signals there is a phase difference of $\pi$ radian and this phase difference corresponds to the phase difference of $\pi/2$ radian in the frequency $f_{SC}$. In the NTSC system, since the color subcarrier signal is orthogonal two-phase amplitude-modulated by two chrominance signals, if one of the points sampled by the above two-phase signals is selected to be a zero-cross point of the subcarrier signal in the original composite signal, the zero-phase chrominance signal $C_2(0)$ and the $\pi$-phase chrominance signal $C_2(\pi/2)$ provided by the two-phase sampling respectively correspond to color difference components (R−Y) and (B−Y) of the original composite signal.

Since the repetitive frequency of the above zero-phase signal and the $\pi$-phase signal is 2 $f_{SC}$, in the frequency spectrum of the two-phase high frequency band signals $S_H(0)=Y_{H2}(0)+C_2(0)$ and that of $S_H(\pi/2)=Y_{H2}(\pi/2)+C_2(\pi/2)$, the center frequency thereof becomes the difference between the sampling frequency 2 $f_{SC}$ and the center frequency $f_{SC}$ of $Y_H+C$, namely, the frequency $f_{SC}$.

In order to shift such two-phase high frequency band signals $S_H(0)$ and $S_H(\pi/2)$ to the base band signals, the following technique is employed in this embodiment.

That is, during the period in which the pulse having, the repetitive frequency $f_{SC}$ and a pulse duty factor of 50%, as shown in FIG. 3B, which is supplied from the clock signal generator 9 to the frequency converter 6, is at low level, the respective sampling values (shown by black circles and black triangles in FIG. 3A) by the zero-phase signal and the $\pi$-phase signal are inverted in code (as shown by white circles and white triangles in the same figure). The code inversion at the repetitive frequency $f_{SC}$ is equivalent to the sampling by the frequency $f_{SC}$ is so that the above two-phase high frequency band signals $S_H(0)$ and $S_H(\pi/2)$ are respectively converted to two-phase base band signals $S_B(0)=Y_H(0)+C(0)$ and $S_B(\pi/2)=Y_H(\pi/2)+C(\pi/2)$ as shown by a broken line and a one-dot chain line in FIG. 3A. At that time, the frequency spectrum (FIG. 2C) of the high frequency band signal $Y_H+C$ with the frequency $f_{SC}$ as its center is folded at a point of zero frequency (FIG. 2D). The two-phase base band signals $S_B(0)$ and $S_B(\pi/2)$ thus obtained contain no color subcarrier wave and are equivalent to the component signal in this standpoint.

If the high frequency band luminance signals $Y_{HA}$ and $Y_{HB}$ are taken as a $\cos \omega_{YHA} t$ and a $\cos \omega_{YHB} t$ ($\omega_{YHA} < \omega_{SC} < \omega_{YHB}$) and the two-phase signals whose frequency-converting frequency is $f_{SC}$ are taken as $\cos \omega_{SC} t$ and $\sin \omega_{SC} t$, the base band signals $Y_{HA}(0)$, $Y_{HB}(0)$, $Y_{HA}(\pi/2)$ and $Y_{HB}(\pi/2)$ are respectively expressed as by the following equations (1) to (4).

$$Y_{HA}(0) = a \cos \omega_{YHA} t \cdot \cos \omega_{SC} t \quad (1)$$

$$= \frac{a}{2} \{\cos(\omega_{YHA} + \omega_{SC})t + \cos(\omega_{YHA} - \omega_{SC})t\} \rightarrow$$

$$\frac{a}{2} \cos(\omega_{YHA} - \omega_{SC})t$$

$$Y_{HB}(0) \rightarrow \frac{a}{2} \cos(\omega_{YHB} - \omega_{SC})t \quad (2)$$

$$Y_{HA}(\pi/2) = a \cos \omega_{YHA} t \cdot \sin \omega_{SC} t \quad (3)$$

$$= \frac{a}{2} \{\sin(\omega_{YHA} + \omega_{SC})t + \sin(\omega_{YHA} - Y_{SC})_9 t\} \rightarrow$$

$$\frac{-a}{2} \sin(\omega_{YHA} - \omega_{SC})t$$

$$Y_{HB}(\pi/2) \rightarrow \frac{-a}{2} \sin(\omega_{YHB} - \omega_{SC})t \quad (4)$$

where the sum frequency component is removed by the low-pass filter 13.

When the folded spectrum of the high frequency band luminance signal $Y_{HB}$ is overlapped on the spectrum of the high frequency band luminance signal $Y_{HA}$, the following equation (5) is established.

$$\omega_{YHA} - \omega_{SC} = -(\omega_{YHB} - \omega_{SC}) = \omega \Delta \quad (5)$$

Substituting the equation (5) into the equations (1) to (4) yields $$Y_{HA}(0) + Y_{HB}(0) = \frac{a}{2} \{\cos \omega \Delta t + \cos(-\omega \Delta)t\} \quad (6)$$

$$= a \cos \omega \Delta t$$

$$Y_{HA}(\pi/2) + Y_{HB}(\pi/2) = \frac{-a}{2} \{\sin \omega \Delta t + \sin(-\omega \Delta)t\} \quad (7)$$

$$= 0$$

The two-phase base band signals $S_B(0)$ and $S_B(\pi/2)$ from the frequency converter 6 and the signal $Y_L$ from the subtracter 7 are supplied to the time-compressing multiplexer 10 and then written in a RAM (random access memory), that is incorporated in the multiplexer 10 under such address control that on the basis of the clock signal with the repetitive frequency of 8 $f_{SC}$, the first data of the line thereof becomes the 0-address of the RAM. As mentioned before, since the sampling frequency in the A/D converter 2 and the BPF 5 is 4 $f_{SC}$, the sampling frequency of the signal $Y_L$ that is the difference signal between the both outputs is also 4 $f_{SC}$. As a result, in the time-compressing multiplexer 10, the low frequency band luminance signal $Y_L$ is time-compressed with a time-compressing ratio 2(= 8 $f_{SC} \div 4 f_{SC}$) to become a time-compressed low frequency band luminance signal $Y_{LC}$ and the frequency spectrum of this signal $Y_{LC}$ is enlarged twice that of the low frequency band luminance signal $Y_L$ that is as shown in FIG. 2B. Further, since the sampling frequency of the two-phase base band signals $S_B(0)$ and $S_B(\pi/2)$ is 2 $f_{SC}$, in the time-compressing multiplexer 10, the above two-phase base band signals are respectively time-compressed with a time-compressing ratio 4 (=8 $f_{SC} \div 2 f_{SC}$) to become a pair of time-compressed base band signals $S_{BC}(0) = Y_{HC}(0) + C_c(0)$ and $S_{BC}(\pi/2) = Y_{HC}(\pi/2) + C_c(\pi/2)$. Accordingly, the frequency spectrum of the both time-compressed base band signals is enlarged four times that of the signal shown in FIG. 2D. The time-compressed low frequency band luminance signals and the time-compressed base band signals thus made are respectively read out from the RAM by known read control means on the basis of the clock signal of 8 $f_{SC}$ in such a manner that they may be inserted into one horizontal period (1H). In this case, since the frequency band of each signal after being time-compressed is made the same, it is possible to use the transmission line efficiently.

The output signal from the time-compressing multiplexer 10 is supplied to and added with a pilot signal (consisting of the synchronizing signal and the burst signal) indicative of the sampled phase of the incoming composite color video signal in the pilot signal adding circuit 11. Thereafter, it is reconverted to the analog signal by the D/A converter 12. This analog signal is a time-compressed serial color signal (hereinafter simply referred to as a time-compressed serial signal) that consists of, as shown in FIG. 4, the horizontal synchronizing signal, the burst signal, the time-compressed low frequency band luminance signal $Y_{LC}$ the time base of which is compressed to $\frac{1}{2}$ and the both time-compressed base band signals $S_{BC}(0)$ and $S_{BC}(\pi/2)$ whose time bases are compressed to $\frac{1}{4}$. Similarly to the prior art, this analog signal is used to directly FM-modulate the carrier wave of the FM-modulator 14 and this FM-modulated signal is supplied through the recording amplifier 15 of appropriate characteristic to the recording head 16 to be recorded on the recording medium.

A reproducing system for reproducing the time-compressed color television signal recorded as above will be described with reference to FIG. 5.

Figure 5:
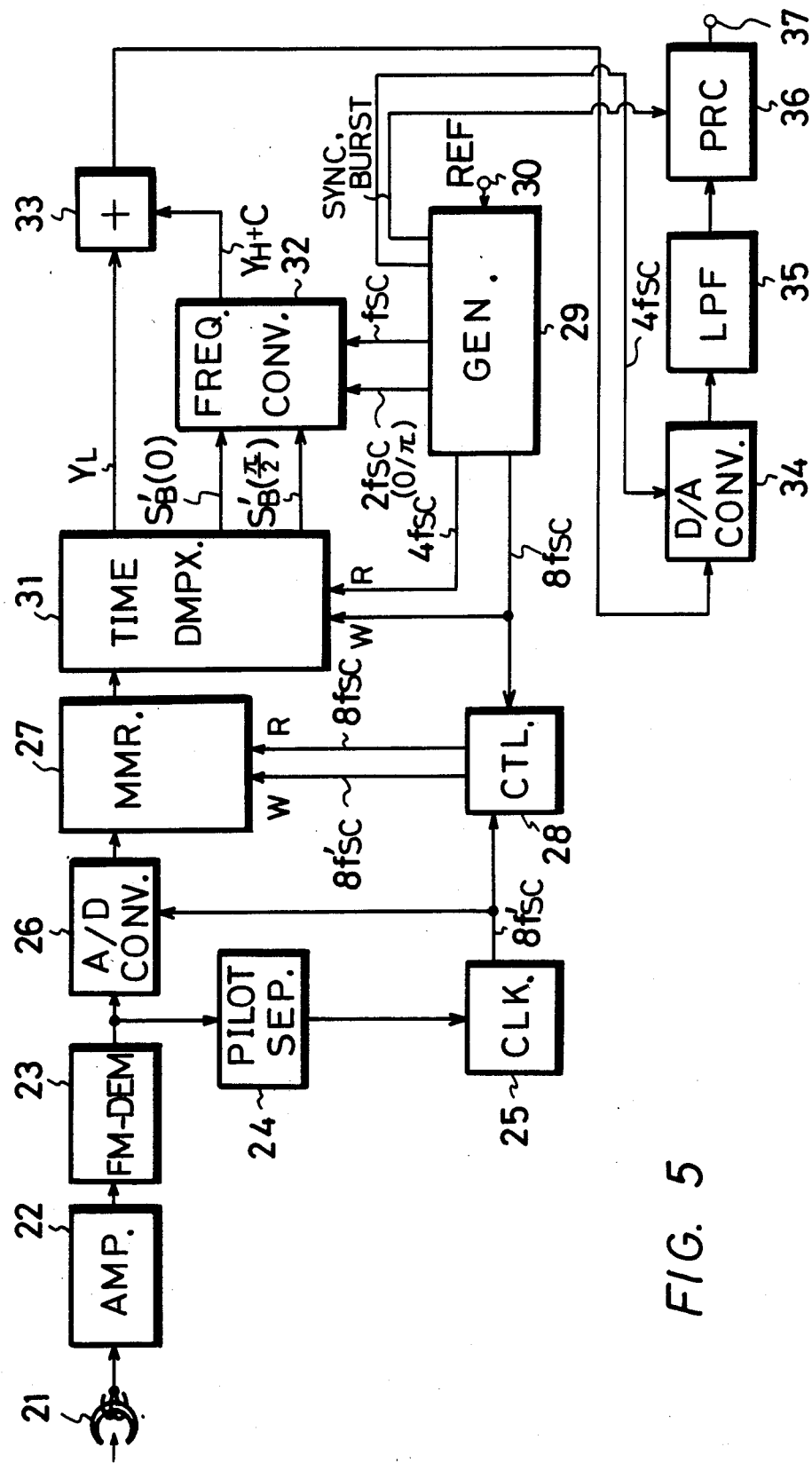
FIG. 5 is a schematic block diagram showing an embodiment of a receiving system (reproducing system) of the apparatus using the color television signal transmitting system according to this invention.

In FIG. 5, reproduced output by a playback head 21 from a recording medium (not shown) is supplied through a playback amplifier 22 to an FM-modulator 23. Reference numerals 24 and 25 respectively designate a pilot signal separating circuit and a clock signal generator. A pilot signal separated from the output of the FM-demodulator 23 shown in FIG. 4 by the pilot signal separating circuit 24 is supplied to the clock signal generator 25. Reference numeral 26 designates an A/D converter and reference numeral 27 designates a memory. The A/D converter 26 is supplied with the analog output of the FM-demodulator 23 and also with a clock signal of frequency 8 f'$_{SC}$ from the clock signal generator 25. The digital output of the A/D converter 26 is supplied to the memory 27. Reference numeral 28 designates a memory control circuit and reference numeral 29 designates a signal generator. The memory control circuit 28 is supplied with the output signal of frequency 8 f'$_{SC}$ from the clock signal generator 25 and the output of frequency, 8 $f_{SC}$ from the signal generator 29 which is generated on the basis of a reference signal REF applied thereto through an input terminal 30. Then, the control signal is supplied from the control circuit 28 to the memory 27.

Reference numeral 31 designates a demultiplexing (separating) and time-expander (hereinafter simply referred to as separating/time-expander) and reference numeral 32 designates a frequency converter. The separating/time-expander 31 is supplied with the time-compressed serial signal that is read out from the memory 27 and the output from the signal generator 29. The frequency converter 32 is supplied with a pair of two-phase base band signals from the separating/time-expander 31, the two-phase signals of frequency 2 $f_{SC}$ and the signal with frequency $f_{SC}$ both from the signal generator 29. The low frequency band luminance signal that is another output of the separating/time-expander 31 and the output of the frequency converter 32 are supplied to an adder 33. The digital output from the adder 33 and the clock signal with frequency 4 $f_{SC}$ from the signal generator 29 are supplied to a D/A converter 34. Reference numeral 36 designates a processor which is supplied with the analog output of the D/A converter 34 through a low-pass filter 35 and the synchronizing signal and the burst signal from the signal generator 29. The output from the processor 36 is delivered to an output terminal 37.

The operation of the reproducing system as shown in FIG. 5 will be described. The pilot signal (consisting of the synchronizing signal and the burst signal) that is separated by the pilot signal separating circuit 24 indicates the sampling phase of the recording system as mentioned before in connection with FIG. 1. This pilot signal is affected by the jitter caused by the tape transporting system of the VTR and hence contains a time base error. Then, the clock signal with frequency 8 $f'_{SC}\{=8\ f_{SC}+\Delta f(t)\}$ that is produced by the clock signal generator 25 which is supplied with this pilot signal is accurately locked to the sampling phase upon the recording mode. On the basis of this clock signal, the analog output of the FM-demodulator 23, namely, the time-compressed serial signal, is A/D-converted by the A/D converter 26 and the output of the A/D converter 26 is written in the memory 27 that forms a time base corrector while controlling its address by the memory control circuit 28. The content or data stored in the memory 27 is sequentially read out therefrom on the basis of the clock signal with very stable frequency 8 $f_{SC}$ that is supplied thereto through the control circuit 28 from the signal generator 29. As a result, the jitter of the VTR is absorbed at this stage.

The separating/time-expander 31 includes a RAM and the time-compressed serial signal that is read out in turn from the memory 27 is sequentially written in the RAM of the separating/time-expander 31 on the basis of the clock signal with frequency 8 $f_{SC}$ from the signal generator 29. Of the time-compressed serial signal written in the RAM, the time-compressed low frequency band luminance signal $Y_{LC}$ is sequantially read out from the RAM on the basis of the clock signal with frequency 4 $f_{SC}$ from the signal generator 29. In this case, since the time-expanding ratio is 2 (=8 $f_{SC}$ ÷4 $f_{SC}$), at this stage, the time-compressed low frequency band luminance signal $Y_{LC}$ is restored to the low frequency band luminance signal $Y_L$. On the other hand, the zero-phase and $\pi$-phase time-compressed base band signals $S_{BC}(0)$ and $S_{BC}(\pi/2)$ are read out from the RAM in parallel on the basis of the clock signal with frequency 4 $f_{SC}$ from the signal generator 29. In this case, the time-expanding ratio of each time-compressed base band signal is 2 (=8 $f_{SC}$ ÷4 $f_{SC}$) and hence at this stage, each time-compressed base band signal is still in the half time-expanded state. The half time-expanded base band signals $S_B'(0)$ and $S_B'(\pi/2)$ from the separating/time-expander 31 are respectively supplied to the frequency-converter 32 and then sampled by the zero-phase and $\pi$-phase sampling signals of frequency 2 $f_{SC}$ that are supplied from the signal generator 29. In the stage of this two-phase sampling operation, each of the half time-expanded base band signals is again time-expanded with the time-expanding ratio 2 and frequency-converted so as to restore the two-phase high frequency band signals $S_H(0)$ and $S_H(\pi/2)$. Since the frequency spectrum of the two-phase high frequency band signal is centered at 2 $f_{SC}$, similarly to the frequency-converter 6 in the recording apparatus, the two-phase high frequency band signal is again frequency-converted in the frequency converter 32 by the pulse signal with frequency $f_{SC}$ supplied thereto from the signal generator 29, thus the original high frequency band signal $Y_H+C$ being produced. This high frequency band signal $Y_H+C$ and the low frequency band luminance signal $Y_L$ from the separating/time-expander 31 are added together in the adder 33 and then converted to the analog video signal by the D/A converter 34. This analog video signal is supplied through the low-pass filter 35 to the processor 36, in which it is added with the synchronizing signal and the burst signal from the signal generator 29 to become the original composite color video signal, which then is delivered to the output terminal 37.

When the high frequency band luminance signal component and the carrier chrominance signal component ($Y_H+C$) are frequency-converted and re-converted in the form of the analog signal, it is extremely difficult to completely match the characteristics of the separation filter for the signal component ($Y_H+C$), the low-pass filter after being converted to the base band, and the band-pass filter after being re-converted upon playback, level of each signal, group delay characteristic, phase of the frequency-converted signal and the like and to maintain them.

In accordance with this invention, since the signal processings of the signal component ($Y_H+C$) are all carried out in the form of the digital signal, there is no defect in the case of the signal processing in the form of the analog signal and so, signal transmission of high quality becomes possible.

If the high frequency band luminance signals $Y_{HA2}(0)$, $Y_{HB2}(\pi/2)$ and $Y_{HB2}(\pi/2)$ in the respective phases that are frequency-converted from the base band in the frequency-converter 32 are expressed by numerical formula, they become as shown by the following equations (8) to (11).

$$Y_{HA2}(0) = Y_{HA}(0) \cdot \cos \omega_{SC} t \qquad (8)$$

$$= \frac{a}{2} \cos(\omega_{YHA} - \omega_{SC})t \cdot \cos \omega_{SC} t$$

$$= \frac{a}{4} \{\cos \omega_{YHA} t + \cos(\omega_{YHA} - 2\omega_{SC})t\}$$

$$Y_{HB2}(0) = \frac{a}{4} \cos \omega_{YHB} t + \cos(\omega_{YHB} - 2\omega_{SC})t\} \qquad (9)$$

$$Y_{HA2}(\pi/2) = Y_{HA}(\pi/2) \cdot \sin \omega_{SC} t \qquad (10)$$

$$= \frac{-a}{2} \sin(\omega_{YHA} - \omega_{SC})t \cdot \sin \omega_{SC} t$$

$$= \frac{a}{4} \{\cos \omega_{YHA} t - \cos(\omega_{YHA} - 2\omega_{SC})t\}$$

-continued $$Y_{HB2}(\pi/2) = \frac{a}{4} \{\cos \omega_{YHB}t - \cos(\omega_{YHB} - 2\omega_{SC})t\} \quad (11)$$

Each second term of the equations (8) to (11) is an unnecessary component. As $\omega_{YH}$ comes close to $\omega_{SC}$, each frequency of the unnecessary component becomes close to $\omega_{SC}$ and becomes unable to be separated by the ordinary filter. However, according to this embodiment, when the high frequency band luminance signal $Y_H$ is obtained by the frequency converter 32, the unnecessary component can be cancelled out. The unnecessary component of the carrier chrominance signal C can be cancelled out perfectly similarly.

When the folded spectrum of the high frequency band luminance signal $Y_{HB}$ is again frequency-converted, the following equation (12) is established.

$$\{Y_{HA}(0) + Y_{HB}(0)\} \cos \omega_{SC}t \quad (12)$$

$$= a \cos \omega \Delta t \cdot \cos \omega_{SC}t$$

$$= \frac{a}{2} \{\cos(\omega \Delta - \omega_{SC})t + \cos(\omega \Delta + \omega_{SC})t\}$$

$$= \frac{a}{2} \{\cos(\omega_{YH} - 2\omega_{SC})t + \cos \omega_{YH}t\}$$

When $\omega_{YHA} = \omega_{SC} \neq -(\omega_{YHB} - \omega_{SC})$ is established, the first item of the equation (12) is cancelled out as set forth above. However, in the case of the folded spectrum, the afore-noted equation (7) becomes zero so that the first item remains as it is and $\omega_{YHB}$ component is reproduced.

While in the above embodiment, the time-compressed low frequency band luminance signal and both time-compressed base band signals are time-compressed so as to be inserted into the 1 H period and then transmitted through one transmission channel, they can be transmitted through two transmission channels. That is, it is possible that the low frequency band luminance signal is not time-compressed and is transmitted through one transmission channel and that both base band signals are time-compressed with time-compressing ratio 2 so as to be inserted into the 1 H period and then transmitted through the other channel. In this case, it is possible that a necessary frequency band of the transmitting apparatus is narrow as compared with that of the transmission of the original signal.

As set forth above, according to this invention, frequency-conversion of the two-phase sampling frequencies is employed to remove the influence of the color subcarrier wave and the time-compressed serial color signal that corresponds to the transmission of the component video signal is obtained and hence signal transmission of high quality becomes possible.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. Apparatus for recording and reproducing a frequency modulated video signal on a recording medium, said video signal being applied thereto and being obtained therefrom as an analog composite color video signal; said apparatus comprising:
   means for converting said video signal from analog form to digital form;
   digital separation means for separating said video signal in digital form into a first frequency band signal and a second frequency band signal including a color subcarrier;
   means for frequency converting said second frequency band signal to first and second base band signals;
   means for time-compressing at least said first and second base band signals;
   means for converting said first frequency band signal and said time-compressed first and second base band signals from digital form to analog form and for recording and reproducing said first frequency band signal and said time-compressed first and second base band signals in an analog mode;
   means for converting said reproduced first frequency band signal and said time-compressed first and second base band signals from analog form to digital form;
   digital recombining means for recombining said reproduced first frequency band signal and said time-compressed first and second base band signals in digital form to produced a recombined digital video signal; and
   means for converting said recombined digital video signal to analog form to reconstitute said analog composite color video signal.

2. The apparatus according to claim 1, in which said means for converting said video signal from analog form to digital form includes an analog-to-digital converter for converting said analog video signal to a digital video signal, and said digital separating means includes a digital band-pass filter connected to said analog-to-digital converter for extracting said second frequency band signal and a subtractor for obtaining said first frequency band signal by subtracting said second frequency band signal from said digital video signal.

3. The apparatus according to claim 2, in which said first frequency band signal is a low frequency band luminance signal and said second frequency band signal is a high frequency band luminance signal including a color subcarrier.

4. The apparatus according to claim 1, in which said means for converting said reproduced first frequency band signal and said time-compressed first and second base band signals from analog form to digital form includes an analog-to-digital converter connected to said reproducing means for converting said reproduced signals from analog to digital form, and said digital recombining means includes time-expanding means connected to said analog-to-digital converter for time-expanding at least said reproduced first and second base band signals, and means for adding said reproduced first frequency band signal to said reproduced time-expanded first and second base band signals.

5. The apparatus of claim 4, wherein said adding means comprises means responsive to said time-expanding means for frequency-converting said reproduced first and second base band signals to reconstitute said second frequency band signal.

* * * * *